(12) United States Patent
Joutsenvirta et al.

(10) Patent No.: US 7,656,835 B2
(45) Date of Patent: Feb. 2, 2010

(54) METHOD FOR INFORMING CHANGED COMMUNICATIONS CAPABILITIES

(75) Inventors: Mika Joutsenvirta, Tampere (FI); Markku Ala-Vannesluoma, Tampere (FI)

(73) Assignee: Nokia Corporation, Espoo (FI)

( * ) Notice: Subject to any disclaimer, the term of this patent is extended or adjusted under 35 U.S.C. 154(b) by 454 days.

(21) Appl. No.: 11/132,698

(22) Filed: May 18, 2005

(65) Prior Publication Data
US 2006/0262732 A1 Nov. 23, 2006

(51) Int. Cl.
*H04Q 7/00* (2006.01)
(52) U.S. Cl. .................. 370/328; 370/313; 370/310; 370/469; 370/474; 370/160; 370/349; 370/392; 370/401; 370/338; 370/352; 370/395.5; 370/521; 370/335; 455/412.1; 455/403; 455/436; 455/449; 455/435
(58) Field of Classification Search .......... 370/313, 370/310, 469, 160, 474, 349, 392, 401, 338, 370/352, 395.5, 521, 335, 389, 419, 465; 455/412.1, 403, 412.2, 436, 445, 449; 713/160; 709/235, 203, 230, 250
See application file for complete search history.

(56) References Cited

U.S. PATENT DOCUMENTS

| | | | | |
|---|---|---|---|---|
| 6,301,479 | B1 * | 10/2001 | Roobol et al. | 455/436 |
| 6,463,285 | B1 * | 10/2002 | Davies et al. | 455/436 |
| 7,164,665 | B2 * | 1/2007 | Tourunen | 370/329 |
| 2002/0093938 | A1 * | 7/2002 | Tourunen | 370/349 |
| 2002/0105971 | A1 * | 8/2002 | Tourunen et al. | 370/469 |
| 2002/0141353 | A1 | 10/2002 | Ludwig et al. | 370/254 |
| 2003/0119488 | A1 * | 6/2003 | Hans et al. | 455/412 |
| 2004/0125793 | A1 * | 7/2004 | Yi et al. | 370/352 |
| 2005/0083886 | A1 * | 4/2005 | Ikeda | 370/331 |
| 2005/0120208 | A1 * | 6/2005 | Dobson | 713/160 |
| 2005/0122923 | A1 * | 6/2005 | Jang et al. | 370/310 |
| 2005/0169205 | A1 * | 8/2005 | Grilli et al. | 370/313 |
| 2007/0025301 | A1 * | 2/2007 | Petersson et al. | 370/338 |

OTHER PUBLICATIONS

"Link Characteristic Information for Mobile IP draft-daniel-mip-link-characteristic-00.txt", Network Working Group, Internet-Draft, Expires: Oct. 12, 2005, S. Daniel Park, et al., Samsung Electronics, Apr. 13, 2005, p. 1-8.

"Mobility Support in Ipv6", D. Johnson, et al., Internet Society 2004, pp. 1-147 (Jun. 2004).

(Continued)

*Primary Examiner*—Rafael Pérez-Gutiérrez
*Assistant Examiner*—Joseph Arevalo
(74) *Attorney, Agent, or Firm*—Perman & Green LLP

(57) ABSTRACT

The present invention relates to a method for informing changed link properties in a system in which a mobile node is communicating by IP (Internet Protocol) with a correspondent node and utilizing a first link layer configuration. A need to change link layer communication to use a second link layer configuration is detected. Property information indicating a link layer property applied or to be applied in communication utilizing the second link layer configuration is defined. The property information is transmitted to the correspondent node. At least one setting for communication between the correspondent node and the mobile node is adapted in the correspondent node on the basis of the received property information.

21 Claims, 4 Drawing Sheets

OTHER PUBLICATIONS

"3rd Generation Partnership Project; Technical Specification Group Radio Access Network; Packet Data Convergence Protocol (PDCP) specification (Release 6)", 3GPP TS 25.323 V6.1.0 (Mar. 2005) pp. 1-23.

"3rd Generation Partnership Project; Technical Specification Group Radio Access Network; Radio Link Control (RLC) protocol specification (Release 6)", 3GPP TS 25.322 V6.3.0 (Mar. 2005), pp. 1-82.

"3rd Generation Partnership Project; Technical Specification Group Services and System Aspects; General Packet Radio Service (GPRS); Service description; Stage 2 (Release 6)", 3GPP TS 23.060 V6.7.0 (Dec. 2004), pp. 1-211.

* cited by examiner

METHOD FOR INFORMING CHANGED COMMUNICATIONS CAPABILITIES

FIELD OF THE INVENTION

The invention relates to informing changed communications capabilities after detecting a change or a need to change link layer communication, for instance due to a handover between links having different data transmission properties.

BACKGROUND OF THE INVENTION

Data services developed for public mobile networks with extensive coverage areas and supporting the mobility of the user have evolved significantly in recent years. The packet switched General Packet Radio Service (GPRS) provides the GSM networks with efficient data transmission, where radio capacity is allocated only during packet transmission. The third generation mobile communications system standardized by the Third Generation Partnership Project (3GPP), also referred to as the 3GPP system or the UMTS system (Universal Mobile Telecommunications System) offers more enhanced data transmission services than the GSM/GPRS networks.

In addition to the data services offered by the PLMN networks, various wireless local networks have been developed that offer a broadband wireless data transmission service for a limited coverage area. The IEEE 802.11-based WLAN networks represent examples of such techniques. Such local networks can be used in different hot spots, such as offices or airports, to offer extremely fast data transmission and access to the Internet. Wireless local area networks and PLMN networks have also been converged. For instance, network elements have also been designed for wireless local area networks that allow the local network to utilize the PLMN network. Network elements have been created for the WLAN networks according to the IEEE 802.11 standard and GSM networks that allow access to the authentication and billing services offered by the GSM network through the WLAN network. The co-operation between PLMN networks and wireless local area networks has been planned further so that the services offered by the PLMN network could also be used through a radio interface offered by the wireless local area networks. In the 3GPP system the wireless local area network might operate as an access sub-system.

In Mobile IP environment it is possible that a mobile node (MN) has two or more different links for data transfer. As mobile devices may move between access networks having very different capabilities, ongoing data transfer may suffer from such transition, especially when the mobile device is moving from a network offering a connection with large data transmission capacity, for instance a WLAN, to a network providing substantially lower data transmission capacity, such as a GPRS network. For instance, a WWW browser of a mobile device has a TCP session with a WWW server and downloads files via this TCP session. If the connection is arranged via WLAN, and suddenly the mobile device moves out of the WLAN coverage, the mobile device must start to use GPRS to continue the TCP session. Because the data transfer rate offered by the GPRS network is slower than that of the WLAN, many packets may be lost and thus many TCP retransmissions need to be executed before TCP congestion control handles this problem.

US 2002/0141353 aims to improve data throughput in the case of a transmission channel switch, where a newly assigned channel has a smaller transmission rate. If a forthcoming channel switch is detected, transmission parameters of the old channel are adapted on the basis of the new channel. For instance, the data transmission rate of the old channel is reduced before the channel switch, whereby it is possible to at least reduce the problems caused by the change to a slower channel. An example of a UMTS channel switch is described, wherein an RRM unit signalizes the channel switch to a MAC unit in order to change the channel parameters.

BRIEF DESCRIPTION OF THE INVENTION

There is now provided an enhanced solution for reducing problems caused by link layer changes. This solution may be achieved by a method, communications devices, and computer program products, which are characterized by what is stated in the independent claims. Some embodiments of the invention are disclosed in the dependent claims.

The invention is based on an idea of transmitting link layer property information from a mobile node to a correspondent node after detecting a change or a need to change link layer communication to use a second link layer configuration instead of an originally used first link layer configuration. The property information indicates at least one link layer property applied or to be applied in communication utilizing the second link layer configuration. A communication setting for communication between the correspondent node and the mobile node is adapted in the correspondent node on the basis of the received property information. It is to be noted that the link layer property information may be transmitted directly after the detection step or at a later stage, possibly after the communication is already changed to use the second link layer configuration.

The term 'link layer property' refers generally to any property or attribute of a link protocol layer. The link layer property information may refer to a specific setting or a parameter of a link layer communication, or an information element otherwise indicating one or more link layer properties, such as a data transfer rate, data transfer class, or a link type. In the ISO protocol stack the link layer is located between a network layer such as the IP (Internet Protocol) and the physical layer. Thus, the link layer is underneath the IP layer and provides local data transmission services for the IP layer. It is to be noted that the link layer may comprise sub-layers as is the case in the 3GPP mobile communication systems. For instance, radio link control (RLC) and medium access control (MAC) may form the OSI link layer. Also the term "link layer configuration" is to be understood generally, such that a change in link layer configuration may involve one or more changes in settings of a link layer and/or a physical layer.

The solution of the invention provides such an advantage that communication between the mobile node and the correspondent node may be adapted in accordance with the (local) changed link layer data transfer of the mobile node. Thus, the upper layer data transfer settings may be changed to better take into account new characteristics of a sub-network, such as a mobile network. For instance, changes in an underlying wireless data transmission medium for the mobile node may be indicated to higher protocol layers and communication adapted accordingly. User experience can be improved in such transitions.

In accordance with an embodiment of the invention, the property information is defined in response to a need to perform a handover for the mobile node from a first access device to a second access device. This embodiment enables to avoid or reduce problems related to changes in connection properties due to handovers. As already indicated, especially handovers between different communications systems may change the link layer properties substantially. The present embodiment facilitates smooth handover procedure.

BRIEF DESCRIPTION OF THE DRAWINGS

In the following the invention will be described in greater detail by means of some embodiments with reference to the accompanying drawings, in which.

DETAILED DESCRIPTION OF THE INVENTION

Figure 1:
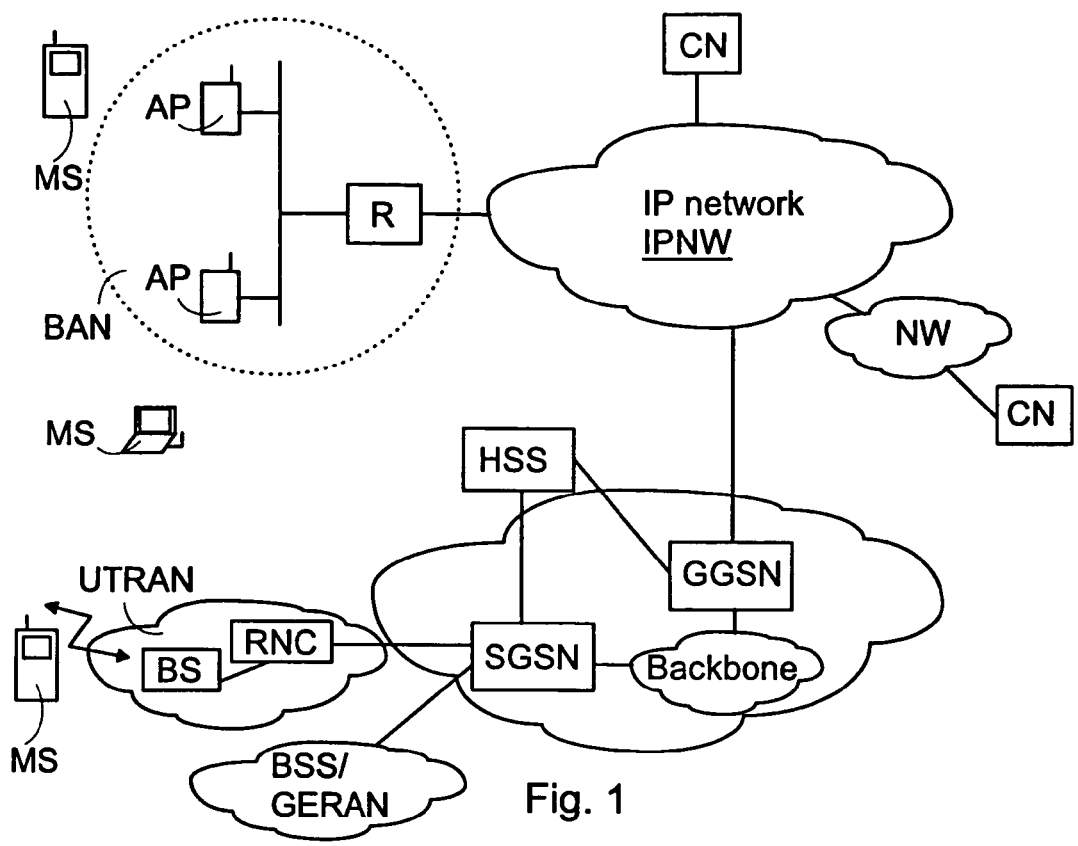
FIG. 1 illustrates a networking system comprising a local area network and mobile communications network.

Referring to FIG. 1, a mobile terminal or a mobile station MS may communicate with a correspondent node CN connected directly or indirectly to an IP network IPNW via at least two types of access networks; via a 3GPP compliant network or via a wireless local network BAN (Broadband Access Network). It is to be noted that instead of being connected to the IPNW, the CN could be connected to some other network, for instance one of the access networks for the MS. Further, the CN is not necessarily the end point of the communication from the MS, but could be an intermediary device. For instance, the correspondent node CN may be for example an SGSN (Serving GPRS Support Node) CN of the public land mobile network PLMN or a GGSN (Gateway GPRS Support Node) CN, whereby the services of the PLMN networks can be utilized through a local network.

FIG. 1 illustrates a local network BAN. The local network BAN is in accordance with an embodiment a wireless local area network employing user authentication and network access control according to an IEEE 802.1x standard, such as a wireless local area network according to the IEEE 802.11i standard. However, the invention can also be applied in other IEEE 802-based wireless local area networks or in other types of local network BANs, typically in networks operating at unlicensed frequency bands, such as a network according to the BRAN (Broadband Radio Access Networks) standard, a Home. RF network or a Bluetooth network.

The access point AP controls the radio interface in accordance with the radio technology used, in the present embodiment in accordance with the IEEE 802.11 standard. The IEEE 802.11 specifications determine the protocols of both a physical layer and a MAC layer for data transmission over the radio interface. Infrared or two spread spectrum techniques (Direct Sequence Spread Spectrum DSSS, Frequency Hopped Spread Spectrum FHSS) can also be employed in data transmission. A 2.4 GHz band is used in both spread spectrum techniques. The MAC layer employs what is known as a CSMA/CA technique (Carrier Sense Multiple Access with Collision Avoidance). The access point AP also bridges radio interface data flows or routes data flows to other network nodes, such as other access points or routers R, and from other network nodes. Typically, the local network BAN comprises one or more sub-networks, and the access points included therein are connected to one another and transfer information to other IP-based networks IPNW through the router R of the sub-network. The MS may for instance be an integrated communication device, a PDA device, or a laptop computer, combined with an apparatus offering radio access (such as a WLAN card). In the present embodiment the MS comprises both WLAN communication means and means for communicating with a 3GPP network.

FIG. 1 further illustrates a 3GPP network, showing only some of the network elements of the 3GPP system. Only one radio access network UTRAN (UMTS Terrestrial Radio Access Network) is shown in FIG. 1. The UTRAN comprises at least one radio network controller RNC and typically several base stations BS, or Node Bs, connected to each radio network controller RNC, the radio network controller RNC controlling radio frequencies and channels of each base station BS connected to it. Mobile stations MS of the 3GPP mobile network, also referred to as user equipment (UE), are connected to at least one base station BS via a radio frequency channel.

Radio network controllers RNC, in turn, are connected to a core network portion for circuit-switched (CS) services (not shown in FIG. 1) and to a core network portion for packet-switched (PS) services, only the latter being disclosed herein in more detail. For a packet-switched connection, the UTRAN is coupled to a Serving GPRS Support Node (SGSN) via an Iu interface for providing a bearer path and a signalling interface between the UTRAN and the SGSN. The serving node SGSN is in contact with a user mobile station MS through a radio network UTRAN. A task of the serving node SGSN is to detect mobile stations MS capable of packet radio connections in its service area, to transmit and receive data packets from these mobile stations MS and to track the location of the mobile stations MS in its service area.

In addition to the serving nodes SGSN, the GPRS packet radio system can comprise at least one gateway node GGSN (Gateway GPRS Support Node). Typically several serving nodes SGSN are connected to one gateway node GGSN. The gateway node GGSN acts as a gateway between the GPRS packet radio system and an external data network such as the IP based network IPNW. External data networks may include the 3GPP or GPRS network of another network operator, the Internet, an X.25 network or a private local area network. Data packets transmitted between the gateway node GGSN and the serving node SGSN are always encapsulated according to the gateway tunnelling protocol GTP. The gateway node GGSN also contains PDP (Packet Data Protocol) addresses and routing information, i.e. SGSN addresses, of the mobile stations MS. The routing information is thus used to link the data packets between the external data network and the serving node SGSN. The network between the gateway node GGSN and the serving node SGSN employs an IP protocol (IPv4/IPv6, Internet Protocol, version 4/6). Records related to packet radio services and comprising subscriber-specific packet data protocol contents are also stored in a home subscriber server HSS. A GSM BSS (base station subsystem), GERAN (GSM/EDGE radio access network), or a WLAN based network may also be used as an access network in the 3GPP system.

It is to be noted that the system of FIG. 1 is only exemplary and that applicability of the present invention is not limited to any specific access network configuration.

Figure 2:
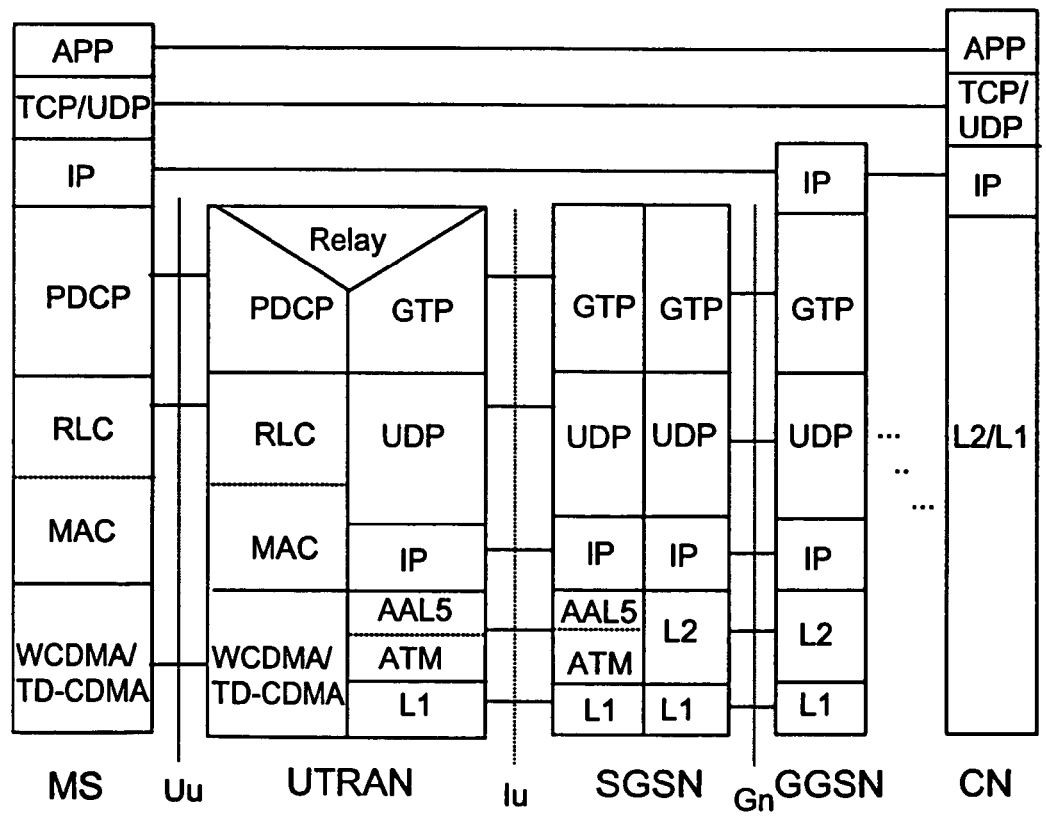
FIG. 2 is a block diagram showing user plane protocol stacks for packet data transfer in a 3GPP system.

FIG. 2 illustrates a protocol stack of a system comprising an access network in accordance with the 3GPP specifications. The 3GPP packet data protocol architecture is divided into a user plane and a control plane. The control plane includes 3GPP-specific signalling protocols. FIG. 2 illustrates the user plane, which delivers user data in protocol data units PDU between the mobile station and GGSN. At the interface Uu between the radio network UTRAN and the mobile station MS, lower-plane data transfer on a physical layer L1 takes place in accordance with the WCDMA or TD-CDMA protocol. The MAC layer on top of the physical layer conveys data packets between the physical layer and the RLC (Radio Link Control) layer, and the RLC layer is responsible for radio link management of different logical connections. The RLC functions include, for instance, segmentation of transmitted data into one or more RLC data packets. PDCP (Packet Data Control Protocol) adapts the needs of upper layers for radio interface protocols below and takes care of the transmission of PDCP data units over a radio sub-network and takes care of the compression and decompression of header fields of IP data flows. The PDCP, RLC and MAC constitute a transmission link layer. SGSN is responsible for routing of data packets received from the mobile station MS via the radio network RAN further to a correct gateway node GGSN. This connection employs a tunnelling protocol GTP, which encapsulates and tunnels all user data and signalling conveyed via the core network. The GTP protocol is run on the IP protocol used by the core network.

The IP protocol may be used in the 3GPP system for two different purposes. The upper IP layer is a so-called application layer IP, which is used between MS and GGSN and for a peer in an external IP network. Thus, there may be multiple IP layers, for instance a transport IP layer between the MS and the GGSN and an upper remote IP layer between the MS and the CN. On top of the upper IP layer it is possible to execute a TCP or UDP protocol, which the applications APP utilize. It should be noted that the applications APP and the upper IP stack may be located in separate terminal equipment (TE), whereby a separate mobile termination (MT) portion serves as a device communicating with the UMTS network. More specific description on the packet radio service of the 3GPP system can be found from a 3GPP specification TS 23.060, *"General Packet Radio Service (GPRS); Service Description; Stage 2"* version 6.7.0, December 2004.

In order to obtain packet-switched services the mobile station MS should perform an attach procedure, in which the location of the MS is made known in SGSN. Thereafter the MS can receive short messages and calls from SGSN. In order to receive and transmit packet-switched data the MS must activate at least one PDP context, which makes the MS known in GGSN and establishes a logical data transmission context in the MS, SGSN and GGSN. While the PDP context is established, there is determined for the MS a PDP address that can be an IPv4 address, an IPv6 address or in accordance with an embodiment of the present invention an IPv6 address including an IPv4 address. In addition to other PDP context data, such as the negotiated QoS profile, the PDP address is determined to be included in context information maintained by GGSN.

When the MS is communicating via the WLAN network BAN or the 3GPP PLMN network, a specific link layer configuration is active and applied in the MS for transmitting and receiving information. The link layer configuration is defined by a plurality of settings and/or other properties specifying the data transfer, and may include parameters of multiple protocol layers. In the present method, link layer property information from the MS is transmitted to the CN after detecting a need to change link layer communication to use a second link layer configuration instead of an originally used first link layer configuration. In the following an embodiment is illustrated, wherein the change is caused by a handover.

Figure 3A:
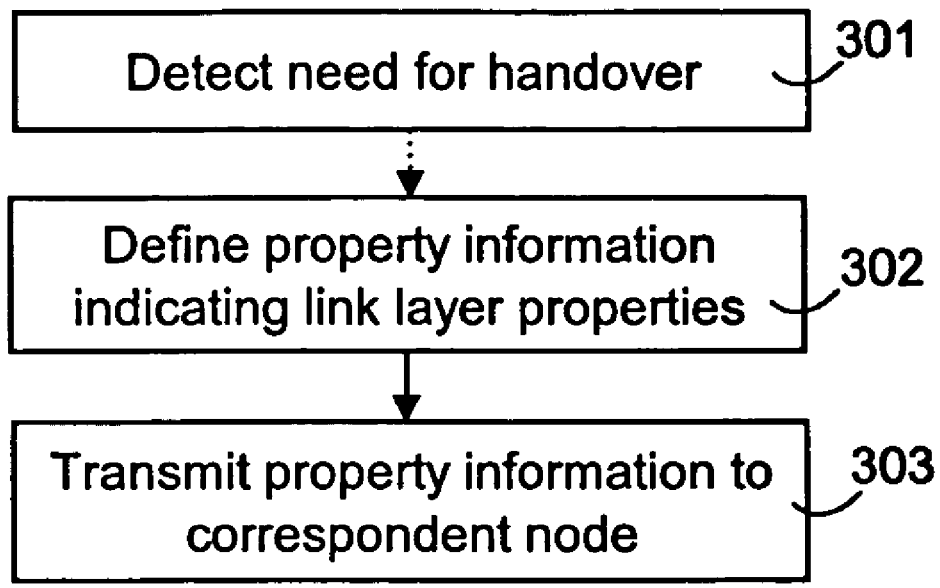
FIGS. 3a and 3b illustrate a method according to an embodiment of the invention.

Referring to FIG. 3a, the following steps are described in a method according to an embodiment carried out in the mobile station MS. A need is detected in step 301 to change the wireless connection of the MS, originally provided by a first access device, to be implemented by a second access device. The need for handover 301 typically arises when the MS moves to the coverage area of the second access device, whereby the MS can be provided with a radio link of substantially better quality through the second access device. In order to have information to the CN before switching to the second access device, the MS may be arranged to immediately enter step 302 for instance on the basis of a decision by a handover decision means that a handover is required. Handover should be widely interpreted to indicate any mechanism that allows changing the logical connection or context enabling data transmission to be handled by the second access device. Thus, changing the packet switched data transmission context to be handled by the second access device means carrying out handover, even though user data is not transferred at that particular moment (in circuit-switched networks handover typically only refers to transferring an active call). The handover could involve merely a change of a channel, or even change of the telecommunications system (inter-system handover). Thus, the handover may also involve changes to the network layer, for instance an IP care of address of the mobile station MS may change.

After the need for handover has been detected, property information indicating (at least) changed link layer properties is defined in step 302. In this step the mobile station MS defines, on the basis of the information stored in the mobile station MS and/or received from the new network, properties associated with a connection by a protocol layer underneath the IP layer. It is to be noted that step 302 may be entered directly after step 301, or that there may be one or more intermediary steps, for instance the mobile station MS may already initiate connection set-up with the second access device.

In step 303 the mobile station MS prepares an information element comprising the property information and transmits this information element to the correspondent node CN. This information element could be an IP packet comprising a Mobile IP header, for instance. The information element may be transmitted using the already existing access via the first access device. Alternatively, if the original access via the first access device is not anymore available, the mobile station MS may transmit the information element via the second access device, or even a further third access device in case such further access device is available.

Figure 3B:
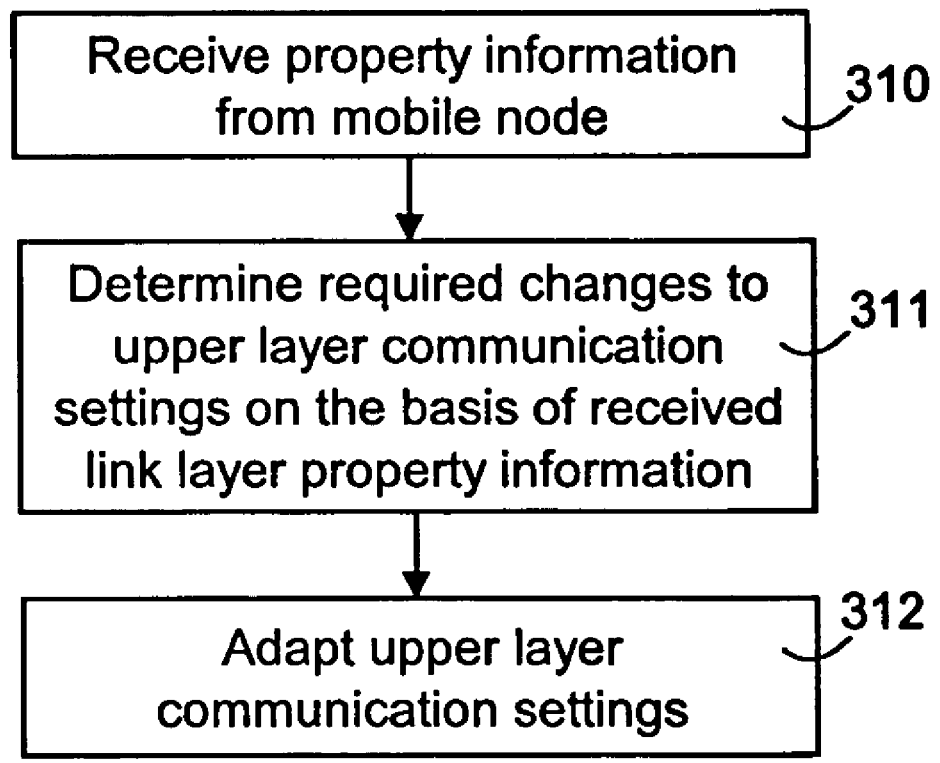

FIG. 3b illustrates steps carried out in the correspondent node CN. In step 310 the CN receives an information element comprising property information of changed connection properties of another peer device of the communication, in the present embodiment the mobile station MS. The CN is arranged to check at least one predetermined portion of the received information element in order to find out the property information. For instance, a message may comprise an indication that it will comprise property information.

On the basis of the detected property information, the CN is in step 311 arranged to determine the required changes to upper layer communication settings. The CN may comprise predetermined mapping instructions or a mapping table on the basis of which changes to application layer and/or TCP/UDP layer settings are configured. The changes determined in step 311 may comprise a new value of a setting, or determine a required change to an original value of a setting, for instance. Changes to the communication settings may be IP address specific, i.e. settings affecting the transfer of a data flow applying an IP address associated with the received property information are changed. Thus, changes required to the settings associated with the IP address are determined.

In step 312 the communication settings are adapted on the basis of the changes determined in step 311. This step involves modification of one or more settings defining TCP/UDP protocol layer operations by a TCP/UDP layer control entity, or one or more application level settings by an application level entity.

One or more protocol entities in the mobile station MS may be arranged to adapt communication settings used for communicating with the correspondent node CN, either directly or indirectly. Therefore, at least some of the features as illustrated above in connection with steps 311 and 312, further illustrated in the following, may be carried out in the mobile station MS.

There are many possible connection properties that the mobile station MS may be arranged to define and transmit (as illustrated in steps 302 and 303) and which may be utilized by the CN and/or the MS for adapting communication settings between the CN and the MS (as illustrated in steps 311 and 312). Some examples are illustrated in the following.

In an embodiment, the property information indicates data transfer rate of a connection provided by or arranged via the second access device. This data transfer rate could be a maximum data transfer rate or a rate guaranteed by the new link, for instance.

The property information may indicate link layer packet properties. In one embodiment the packet unit size of the new link is indicated to the CN. For instance, indication of a maximum transmission unit (MTU) utilized in the new link may be defined in the MS and transmitted to the CN. On the basis of the packet properties, the CN may be arranged to adapt TCP, UDP and/or IP layer settings. In one example the CN is arranged to adapt a maximum segment size (MSS) applied in the TCP layer on the basis of the received property information indicating the MTU. The MSS determines how much the CN may transmit TCP data in one segment. Thus, the segment size in TCP layer communication between the MS and the CN may be adapted to optimally comply with the MTU applied in the link layer. The CN is arranged to adapt its settings such that fragmentation is avoided.

In one embodiment the communication setting specifying communication between the correspondent node CN and the mobile node (MS), and modified on the basis of the received property information, is a TCP layer flow control setting. For this embodiment the data transfer rate may be used as the property information. In a further embodiment the size of the TCP transmission window applied for the data flow associated with the received property information is adapted on the basis of the received property information. This embodiment enables to adapt TCP buffers if the throughput of the new link is very different from the original link.

In one embodiment the RTP (Real-time Transport Protocol) is used above the UDP layer for transmitting real-time data between the CN and the MS. One or more RTP specific or related settings may be adapted on the basis of the received property information. In a further embodiment, a codec applied for the RTP is changed on the basis of the received property information.

Various aspects affecting the operation of one or more applications can be arranged to be adapted on the basis of the received property information. In one embodiment the adapted communication setting is a codec applied by an application, such as a multimedia streaming application. Thus a codec may be changed to one more appropriate to the new access link of the other party. In another embodiment one or more of the settings of the applied codec are adapted.

In one embodiment the property information indicates at least one property of a packet data transfer context established or to be established for the mobile station MS. Such packet data transfer context is the PDP (Packet Data Protocol) context arranged for GPRS packet data services in GSM/GPRS and 3GPP systems. Regarding PDP context information maintained in a GPRS compliant mobile terminal, reference is made to 3GPP specification TS 23.060, "General Packet Radio Service (GPRS); Service Description; Stage 2" version 6.7.0, December 2004, in particular Table 8 in Chapter 13.4, the specification being incorporated herein by reference. The mobile station MS may be arranged to transmit some PDP context specific information specified in this Table. For instance, the requested quality of service (QoS) profile information or indication of the requested QoS profile may be transmitted to the CN. Further, the terminal may be arranged to define only some portion of the QoS profile information, for instance the requested bit rate (for the PDP context) is informed to the CN. The packet data control protocol (PDCP) is described in 3GPP TS 25.323, version 6.1.0, incorporated herein by reference.

In one embodiment the property information indicates at least one property of the RLC- and/or MAC layer applied in the mobile station MS. For instance, one or more of the RLC layer properties specified in 3GPP TS 25.322, version 6.3.0, incorporated herein by reference, may be utilized.

In one embodiment the property information defined for and transmitted to the CN is not specific only to the new connection provided by the second access device but such information may be derived from at least most of the data transmission systems. The formats and types of the property information may be standardized. There may be a specific conversion function in the MS changing the representation format of connection property from a link layer technology specific format to a more generic format used between the MS and the CN. This conversion could be applied before step 303. For instance, a number of predetermined data transfer rate classes could be applied: The MS may then select a class such that the data transfer rate of the new connection falls in the predetermined range of the class. For instance, class 3 could include data transfer rates between 200-300 kbit/s. Further, the CN may comprise a conversion function utilized in step 311 for determining the required changes on the basis of the received property information in the generic format. This embodiment enables to avoid link specific adaptation information in the CN, and the property information (in a predetermined format) from the MS to the CN may include properties of different link layer technologies. For instance, when the MS returns to a coverage area of the local network BAN, the same property information type(s) can again be informed to the CN. The CN can then in a corresponding way adapt the communication with the MS to the new BAN properties, such as the higher data transfer rate.

The application of the invention is not limited to any specific connection property and therefore it is possible to apply also other properties besides or instead of the above illustrated properties. For instance, information on delay or on error ratio could be applied. Further, multiple properties may be applied in any appropriate combination.

There are many possible implementation schemes for arranging the delivery of the property information from the MS to the CN. Some examples are illustrated in the following but the application of the invention is not limited to any specific delivery method.

In one embodiment the property information is transmitted in an IPv6 mobility specific message. In a further embodiment the property information is transmitted to the correspondent node CN in a Binding Update message or in a Care of Test Init message. Such new message structure can be used as an IPv6 mobility header originated from the mobile node MN to the correspondent node CN. One or more mobility option types may be specified for Binding Update messages. For instance, mobility option types may be specified for an MTU of a link and a data transfer rate of a link. It is possible to add new mobility option types to the Binding Update messages later if necessary.

For more details on IPv6 mobility, reference is made to the IETF specification RFC 3775, *"Mobility support in IPv6"*, June 2004, 165 pages, incorporated herein by reference. In particular, the transmission of binding updates is described in Chapter 11.7, the reception of binding updates is described in Chapter 9.5 and the general IPv6 mobility header is described in Chapter 6 (the current form of Binding Update messages is described in Chapter 6.1.7).

However, the transmission of property information to the correspondent node CN is not limited to any specific transmission technique. In one embodiment the property information is transmitted by IPv4 based mechanisms. For instance, in one embodiment MOBIKE (IKEv2 Mobility and Multihoming Working Group) messages are utilized to transfer the property information. MOBIKE specifies extensions to the IKEv2 (Internet Key Exchange) protocol to enable its use in the context where there are multiple IP addresses per host (multihoming, SCTP) or where the IP addresses change in the control of the IPsec host (mobility and roaming). An important scenario is to make it possible for a VPN user to move from one address to another without re-establishing all security associations, or to use multiple interfaces simultaneously, such as simultaneous use of WLAN and GPRS. More information on MOBIKE is available at http://www.ieff.org/html.charters/mobike-charter.html.

Figure 4:
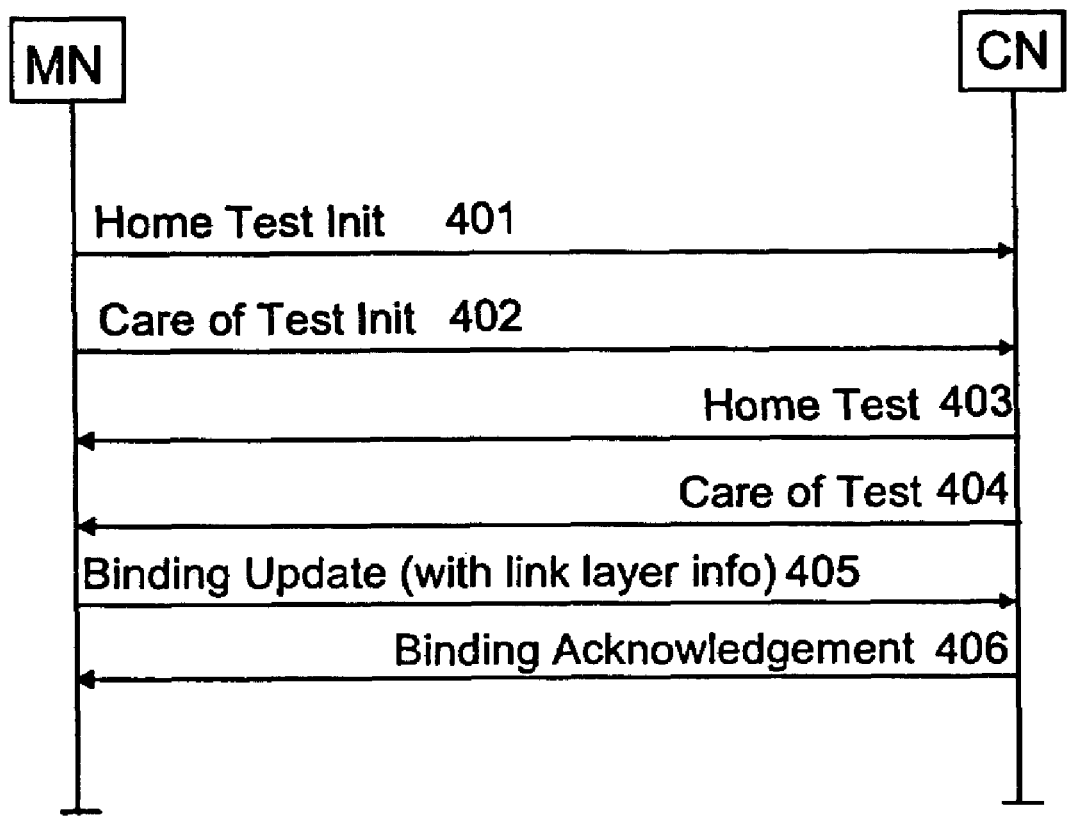
FIG. 4 is a signalling diagram showing handover in accordance with an embodiment of the invention.

FIG. 4 is a signaling diagram that further illustrates a signaling flow of messages in accordance with an embodiment of the invention applying the MIPv6. When one or more link layer properties are changed or need to be changed for the MS, the MS initiates the communication with the CN by transmitting a Home Test Init message 401 and Care of Test Init message 402 to the CN. The CN replies with Home Test message 403 and Care of Test message 404. These messages and their usage are described in the RFC 3775. Next, the MS prepares and transmits a Binding Update message 405 comprising link layer information. The CN replies with a Binding Acknowledgement message 406.

It is to be noted that the MS transmits a Binding Update to a home agent before informing the correspondent node CN. In certain situations also the home agent may be considered as the correspondent node. In this case, also the link layer property information may be transmitted from the MS to a device functioning as a home agent, for instance to a support node in a GPRS/3GPP core network.

The CN may also respond to the message comprising the property information and transmitted from the MS. In one embodiment the MS is arranged to delay the handover to the second access point. The delaying may be adjusted to aim to have the handover after the settings in the CN have been changed. The delay could be based on a predetermined delay period or a response from the CN. Especially in the case of a transition to a slower link, it is advantageous to first transmit the property information to the CN using the faster link. It is to be noted that the delaying is not always preferable if the link is suddenly lost or the link quality very quickly declines. Thus, the MS may be arranged to perform delaying only if the current link to the first access point is above a predetermined criterion, for instance the signal strength is adequate. The delaying may further reduce problems and packet losses caused by changed link properties.

Although in the above embodiments the property information has been transmitted to the CN before the handover to the second access device, in an alternative embodiment the property information is transmitted after the handover and the communication settings in the CN can be adapted accordingly. At least some of the above illustrated features may also be applied in this embodiment.

Figure 5A:
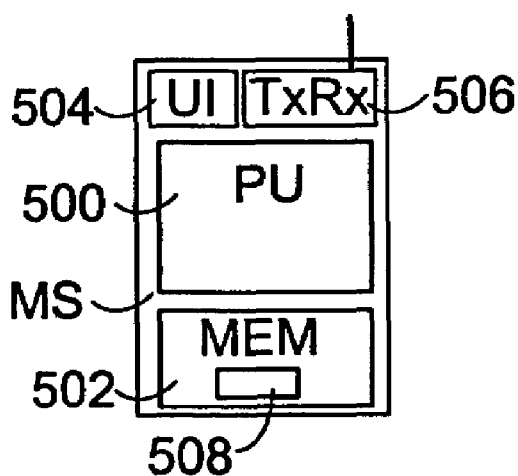
FIG. 5a illustrates a mobile station capable of functioning as a correspondent node.
Figure 5B:
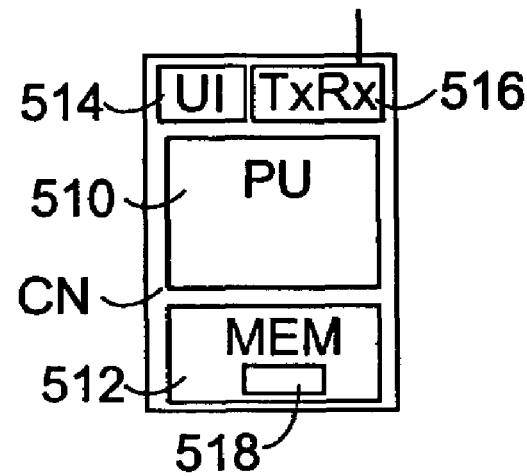
FIG. 5b illustrates a device capable of functioning as a correspondent node.

As illustrated in FIGS. 5a and 5b, the devices MS, CN comprise one or more processing units 500, 510, respectively. Computer program code portions 508, 518 stored in the memories 502, 512 and executed in the processing units 500 and 510, respectively, may be used for causing the devices MS, CN to implement means for providing the inventive functions relating to arranging adaptation of communication settings on the basis of a new link layer connection, some embodiments of the inventive functions were illustrated above in association with FIGS. 2, 3a, 3b, and 4. The mobile station MS further comprises a user interface 504 and a transceiver 506 for wireless communication. The device functioning as the correspondent node CN also comprises data transfer means 516 and typically also a user interface 514. A chip unit or some other kind of hardware module for controlling the device MS, CN may, in one embodiment, cause the device to perform the inventive functions. The hardware module comprises connecting means for connecting the device MS, CN mechanically and/or functionally. Thus, the hardware module may form part of the device and could be removable. Some examples of such hardware module are a sub-assembly, a portable data storage medium, an IC card, or an accessory device. Computer program codes can be received via a network and/or be stored in memory means, for instance on a disk, a CD-ROM disk or other external memory means, where from they can be loaded into the memory of the devices MS, CN. The computer program can also be loaded through a network by using a TCP/IP protocol stack, for instance. Hardware solutions or a combination of hardware and software solutions may also be used to implement the inventive functions.

A control entity, for instance a handover manager performed by execution of a stored program code 508 in a processing unit 500, in the mobile station MS may be arranged to detect the need to change a channel and instruct another entity, for instance an IP layer entity, to transmit the property information to the CN. The mobile station MS may comprise an entity managing link layer capabilities or at least having access to link layer properties, herein referred to as link layer capability manager. This link layer capability manager may carry out at least some of the above illustrated features in the MS. The link layer capability manager may maintain information on link layer property information of available links and the property information to the CN may be obtained from the link layer manager. In another exemplary implementation the handover manager may submit information on new link layer connection to the link layer capability manager which may initiate the transmission of the information to the CN. The link layer capability manager may submit the L2 property information to a protocol entity implementing the MIPv6. This protocol entity arranges the addition of the property information into an IPv6 mobility header. In one embodiment the link layer capability manager is arranged in the MS such that any one of the OSI stack layers 3 to 7 may access it.

Figure 6A:
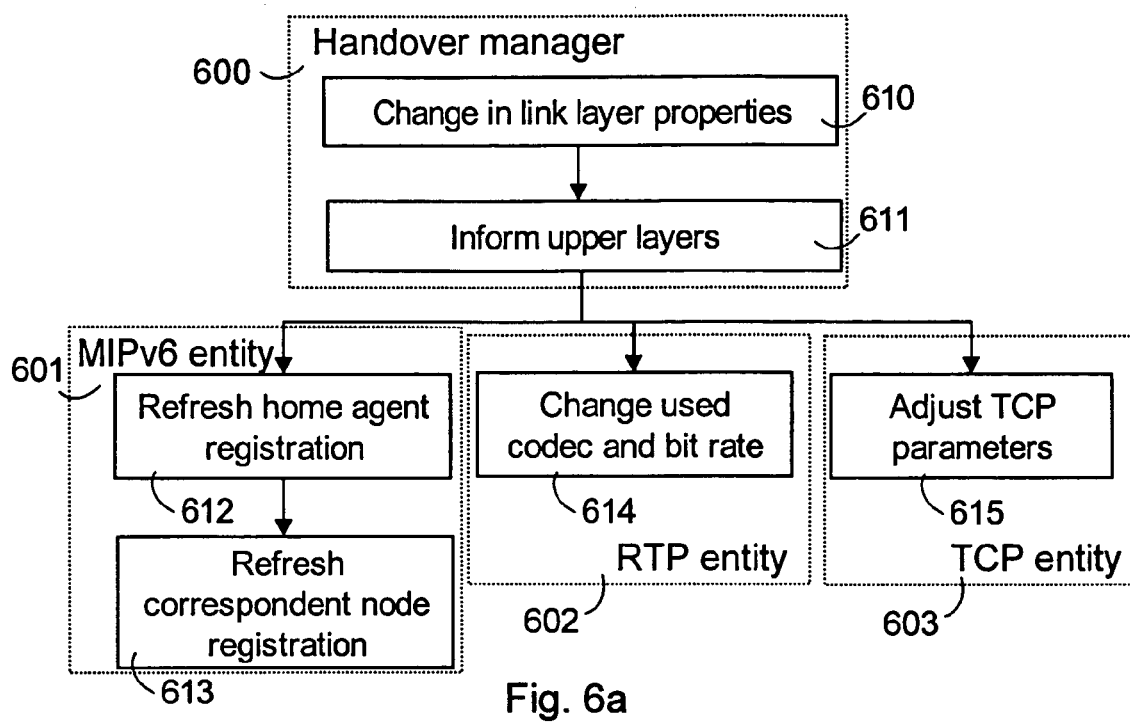
FIG. 6a illustrates relationships between entities and their functions in a mobile station in accordance with an embodiment of the invention.
Figure 6B:
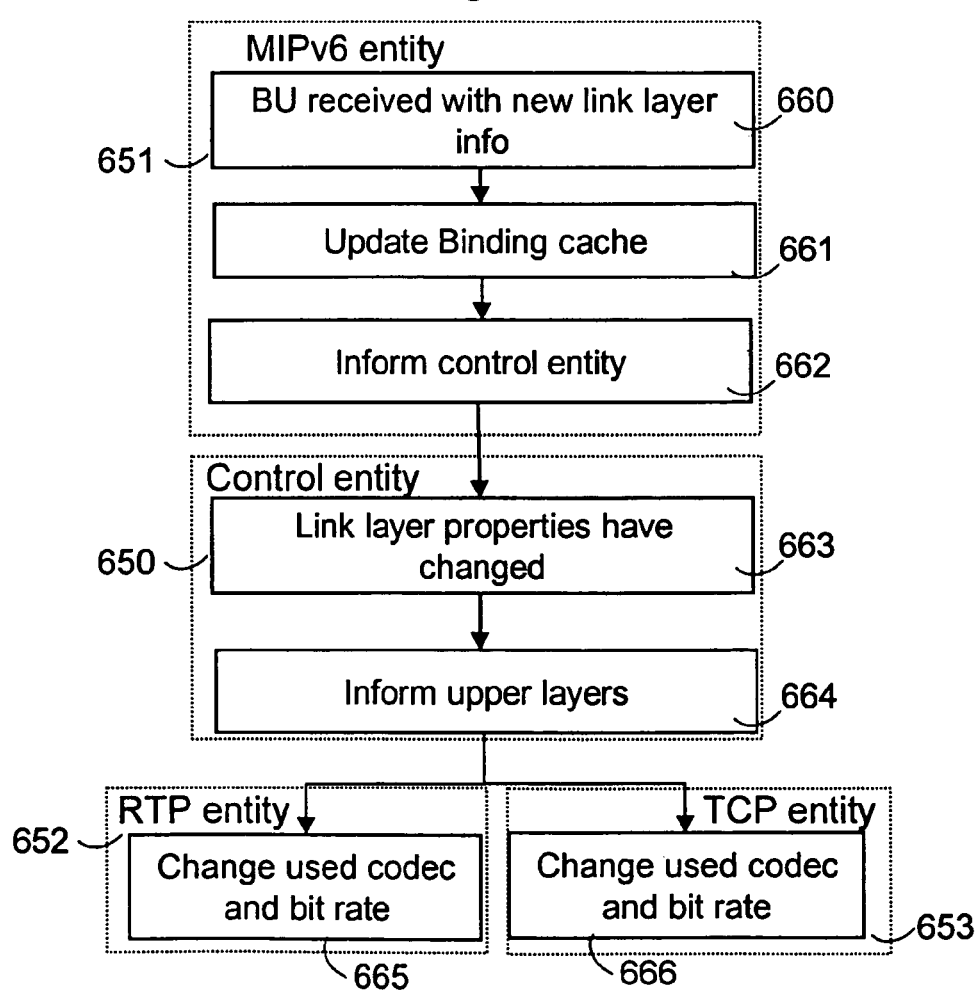
FIG. 6b illustrates relationships between entities and their functions in a correspondent node in accordance with an embodiment of the invention.

FIGS. 6a and 6b illustrate relationships between entities in the MS and the CN, respectively. As shown, the MS comprises the handover manager 600, a MIPv6 layer entity 601, an RTP layer entity 602, and a TCP layer entity 603. In the embodiment illustrated in FIG. 6a, the handover manager 600 detects 610 a change or a need to change link layer properties and informs 611 upper layers. MIPv6 entity 601 may refresh 612 the home agent registration. The CN registration is also refreshed 613 such that information on the changed link layer properties is included in the message to the CN. Further, the RTP entity 602 may be informed, whereby the used codec and/or bit rate may be changed 614. In one embodiment, the TCP entity 603 in the MS is informed, whereby one or more TCP parameters may be adjusted 615, as already illustrated.

In the present embodiment applying the IPv6, an entity implementing the MIPv6 in the CN may detect the property information from the received mobility header and transmit them to an entity determining and/or managing the settings to be adapted (for instance an entity implementing the TCP, the UDP, and/or the RTP, an application manager, or a manager specifically arranged to provide the above illustrated adaptation). Such entities or managers may be performed by execution of a stored program code 518 in the processing unit 510.

Referring to FIG. 6b, upon receiving 660 an IPv6 message including link layer property information, the MIPv6 entity 651 in the CN updates 661 the Binding Cache for the destination IP address, i.e. for the MS. The MIPv6 entity 651 also informs 662 a controlling entity 650 which detects 663 that link layer properties have changed to the destination device, and informs 664 upper layers. In the embodiment of FIG. 6b an RTP layer entity 652 may be informed, whereby the used codec and/or bit rate may be adapted 665. In one embodiment, a TCP layer entity 653 is informed, whereby TCP layer parameters may be adjusted 666.

The received property information may involve and possibly be delivered via one or more intermediate entities such as an entity implementing the IP. It is also to be noted that it is not necessarily the mobile node (the mobile station MS in the above embodiment) that defines the property information and transmits it to the CN, but an intermediate network element may be arranged to perform these tasks. For instance, a mobile router in the 3GPP system or in an IP network IPNW for hiding MIPv6 signaling may be arranged to detect the property information and transmit to the CN.

In the embodiment applied for WLAN and 3GPP systems, the handover manager (or some other entity controlling the above illustrated method) may be arranged to follow and/or detect link changes and link property changes for all link types (for instance GPRS, WLAN) and deliver the property information of the new link to the TCP/IP layer.

It is obvious for those skilled in the art that as technology progresses the basic idea of the invention can be implemented in various ways and for handovers between different networks (inter-system) and/or inside a single network (intra-system). The change in link layer properties causing the present informing functions is not necessarily due to a handover. For instance, the present method may also be caused by network initiation, for instance due to changes in network load. In one embodiment the data transfer rate of an active PDP context is changed in a 3GPP system, whereby the above illustrated method may be applied. In this case, the change of PDP context property constitutes a link configuration change (to a faster or slower one). The invention may be applied in a system including any second generation, third generation and/or fourth generation mobile communications system.

The invention and the embodiments thereof are therefore not restricted to the above examples but may deviate within the scope of the claims. Different features may thus be omitted, modified, replaced by equivalents, or combined with other above illustrated features.

The invention claimed is:

1. A method for informing changed communications properties in a communications system, the method comprising:
    detecting a need to change link layer communication to use a second link layer configuration for a handover of a mobile node from a first link layer configuration to the second link layer configuration, the mobile node communicating by IP (Internet Protocol) with a correspondent node and utilizing the first link layer configuration, the correspondent node serving as an adaptor of layer settings,
    defining property information indicating at least one link layer property applied or to be applied in communication utilizing the second link layer configuration,
    transmitting the property information to the correspondent node to enable transference of the link layer property information directly after the detection or later after the communication is changed to the second link layer configuration, wherein the property information is transmitted to the correspondent node in a binding update message or in a Care of Test Init message,
    receiving the property information by the correspondent node, and
    adapting, in the correspondent node, at least one setting for communication between the correspondent node and the mobile node on the basis of the received property information, wherein the property definition and the transmission of the property information to the correspondent node are arranged before the change to the second link layer configuration.

2. A method as claimed in claim 1, wherein the property information is defined in response to a need to perform a handover for the mobile node from a first access device to a second access device.

3. A method as claimed in claim 2, wherein the first access device is an access point of a wireless local network and the second access device is part of a PLMN (Public Land Mobile Network) system.

4. A method as claimed in claim 1, wherein a TCP (Transmission Control Protocol) layer setting in the correspondent node is adapted on the basis of the received property information.

5. A method as claimed in claim 1, wherein the property information indicates data transmission rate of the second link layer configuration.

6. A method as claimed in claim 1, wherein the system supports IPv6 mobility, to enable the transmission of the property information to the correspondent node in the binding update message or in the Care of Test Init message.

7. A communications device for a communications system, the communications device comprising:
    means configured to arrange link layer communication on the basis of a first link layer configuration,
    means configured to detect a need to change link layer communication to use a second link layer configuration for a handover of a mobile node from the first link layer configuration to the second link layer configuration,
    means configured to define property information indicating at least one link layer property applied or to be applied in communication utilizing the second link layer configuration, means configured to transmit the property information to a correspondent node of the communications system to enable transference of the link layer property information directly after the detection or later after the communication is changed to the second link layer configuration, wherein the property information is transmitted to the correspondent node in a binding update message or in a Care of Test Init message, and wherein the communications device is configured to carry out the property definition and the transmission of the property information to the correspondent node before the change to the second link layer configurations, means configured to receive the property information by the correspondent node, and means configured to adapt, in the correspondent node, at least one setting for communication between the correspondent node and the mobile node on the basis of the received property information, wherein the property definition and the transmission of the property information to the correspondent node are arranged before the change to the second link layer configuration.

8. A communications device as claimed in claim 7, wherein the communications device is configured to define the property information in response to a need to perform a handover for the mobile node from a first access device to a second access device.

9. A communications device as claimed in claim 8, wherein the first access device is an access point of a wireless local network and the second access device is part of a PLMN (Public Land Mobile Network) system, and the communications device is configured to perform a handover between the first access device and the second access device.

10. A communications device as claimed in claim 7, wherein the communications device is configured to define as the property information at least one property of a packet data protocol (PDP) context established, to be established, or modified for the device.

11. A communications device as claimed in claim 7, wherein the communications device is configured to define as the property information a data transmission rate of the second link layer configuration.

12. A communications device as claimed in claim 7, wherein the communications device is configured to specify the property information in an IPv6 (Internet Protocol version 6) mobility binding update message or in a Care of Test Init message to enable said transmission of the property information to the correspondent node.

13. A communications device for a communications system, the communications device being configured:

to communicate with another device by IP (Internet Protocol) for a handover of a mobile node from a first link layer property of the communications device to a second link layer property of the other device, the other device serving as an adaptor of layer settings, wherein information of the property is transmitted to the other device in a binding update message or in a Care of Test Init message, to receive from the other device property information indicating at least one link layer property applied or to be applied in local link layer communication of the other device to enable transference of the link layer property information directly after detection of a need to change link layer communication or later after the communication is changed to the second link layer configuration, and to adapt at least one communication setting for communication with the other device on the basis of the received property information, wherein the communications device is further configured to adapt an application layer setting comprising an applied media codec on the basis of the received property information.

14. A communications device as claimed in claim 13, wherein the communications device is configured to adapt a TCP layer setting on the basis of the received property information.

15. A communications device as claimed in claim 14, wherein the communications device is configured to adapt the segment size in TCP layer communication on the basis of the received property information.

16. A communications device as claimed in claim 13, wherein the communications device is configured to obtain the property information from a received IPv6 (Internet Protocol version 6) mobility of the binding update message or the Care of Test Init message.

17. A storage medium having a computer program for operation of a processor for a handover of a mobile node from a first link layer configuration to a second link layer configuration of a communication system, the computer program comprising a computer program code configuring the processor, upon application of the program code to the processor, to:

detect a need to change link layer communication to use said second link layer configuration instead of said first link layer configuration for said handover, define property information indicating at least one link layer property applied or to be applied in communication utilizing the second link layer configuration, prepare the property information for transmission to a correspondent node of a part of the communication system operating with said second link layer configuration to enable transference of the link layer property information directly after detection of a need to change link layer communication or later after the communication is changed to the second link layer configuration, wherein the property information is transmitted to the correspondent node in a binding update message or in a Care of Test Init message receive the property information by the correspondent node, and adapt, in the correspondent node, at least one setting for communication between the correspondent node and the mobile node on the basis of the received property information, wherein the property definition and the transmission of the property information to the correspondent node are arranged before the change to the second link layer configuration.

18. A method for informing changed communications properties in a communications system, wherein a mobile node is communicating by IP (Internet Protocol) with a correspondent node and utilizing a first link layer configuration, the method comprising:

detecting a need to change link layer communication to use a second link layer configuration for a handover of the mobile node from the first link layer configuration to the second link layer configuration, defining property information indicating at least one link layer property applied or to be applied in communication utilizing the second link layer configuration, transmitting the property information to the correspondent node to enable transference of the link layer property information directly to the correspondent node after a changing to the second link layer configuration, to enable a transmission of the property information to the correspondent node in a binding update message or in a Care of Test Init message, wherein the property definition and the transmission of the property information to the correspondent node are arranged before the change to the second link layer configuration receiving the property information by the correspondent node, and adapting, in the correspondent node, at least one setting for communication between the correspondent node and the mobile node on the basis of the received property information, wherein the property definition and the transmission of the property information to the correspondent node are arranged before the change to the second link layer configuration.

19. A method as claimed in claim 18, wherein the property information is defined in response to a need to perform a handover for the mobile node from a first access device to a second access device.

20. A method as claimed in claim 19, wherein the first access device is an access point of a wireless local network and the second access device is part of a PLMN (Public Land Mobile Network) system.

21. A method as claimed in claim 18, wherein the property information indicates data transmission rate of the second link layer configuration.

* * * * *

UNITED STATES PATENT AND TRADEMARK OFFICE
CERTIFICATE OF CORRECTION

PATENT NO. : 7,656,835 B2  Page 1 of 1
APPLICATION NO. : 11/132698
DATED : February 2, 2010
INVENTOR(S) : Mika Joutsenvirta It is certified that error appears in the above-identified patent and that said Letters Patent is hereby corrected as shown below:

IN THE CLAIMS:

Column 13, line 12, in Claim 7, delete "configurations," and insert --configuration--, therefor Signed and Sealed this Twenty-fourth Day of August, 2010

David J. Kappos
*Director of the United States Patent and Trademark Office*